(12) United States Patent
Ernst

(10) Patent No.: US 8,770,418 B2
(45) Date of Patent: Jul. 8, 2014

(54) SINGLE COMPONENT TWIST LOCK SOCKET CLIP

(75) Inventor: Dylan G Ernst, Eagle Creek, OR (US)

(73) Assignee: Ernst Manufacturing, Inc., Sandy, OR (US)

( * ) Notice: Subject to any disclaimer, the term of this patent is extended or adjusted under 35 U.S.C. 154(b) by 435 days.

(21) Appl. No.: 12/912,734

(22) Filed: Oct. 26, 2010

(65) Prior Publication Data

US 2012/0096698 A1 Apr. 26, 2012

(51) Int. Cl.
*A47F 7/00* (2006.01)
*B23Q 3/00* (2006.01)

(52) U.S. Cl.
USPC ........... 211/70.6; 211/69; 269/37; 269/289 R; 269/291; 269/309

(58) Field of Classification Search
USPC .................. 29/428, 525.01; 211/70.6, 69; 269/289 R, 271, 37, 291, 309–310
See application file for complete search history.

(56) References Cited

U.S. PATENT DOCUMENTS

| | | | |
|---|---|---|---|
| 3,731,260 A * | 5/1973 | Nardone et al. | 439/548 |
| 4,191,366 A * | 3/1980 | Rabin | 269/47 |
| 4,826,021 A | 5/1989 | Burrell | |
| 4,941,571 A | 7/1990 | Barrett et al. | |
| 5,398,823 A | 3/1995 | Anders | |
| 5,467,874 A | 11/1995 | Whitaker | |
| 5,715,951 A * | 2/1998 | Dembicks | 211/70.6 |
| 5,725,107 A * | 3/1998 | Dembicks | 211/70.6 |
| 5,855,284 A * | 1/1999 | Dembicks | 211/70.6 |
| 6,070,745 A * | 6/2000 | Dembicks | 211/70.6 |
| 6,386,363 B1 | 5/2002 | Huang | |
| 6,450,338 B1 | 9/2002 | Chen | |
| 6,494,329 B1 | 12/2002 | Dembicks | |
| 6,712,225 B2 | 3/2004 | McNeely | |
| 6,991,105 B2 | 1/2006 | Winnard | |
| 7,232,121 B2 * | 6/2007 | Haruna | 269/309 |
| 8,381,905 B1 * | 2/2013 | Kao | 206/378 |
| 2003/0150824 A1 * | 8/2003 | McNeely | 211/70.6 |
| 2011/0048989 A1 | 3/2011 | Winnard | |
| 2011/0089126 A1 * | 4/2011 | Hsieh | 211/70.6 |
| 2013/0186243 A1 * | 7/2013 | Harper et al. | 81/180.1 |

* cited by examiner

*Primary Examiner* — Essama Omgba
*Assistant Examiner* — Darrell C Ford
(74) *Attorney, Agent, or Firm* — patenttm.us

(57) ABSTRACT

A twist lock socket clip employs a cam over member for engagement and locking of a socket for storage or transport. A post of the clip receives the socket bore thereover and upon twisting of the socket, a cam over member depresses from engagement with the walls of the socket bore, and upon continued twisting, the cam over member relaxes and secures the socket by interaction of the socket bore detent and corresponding members on cam over arms.

6 Claims, 4 Drawing Sheets

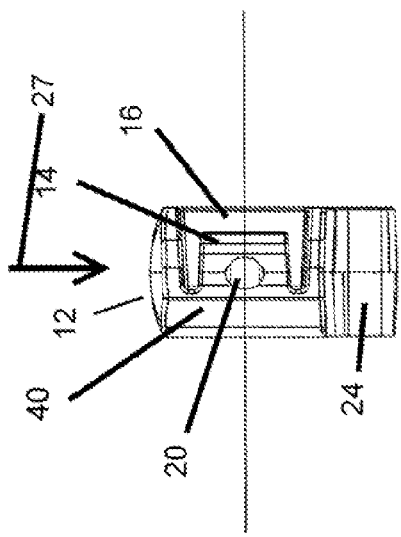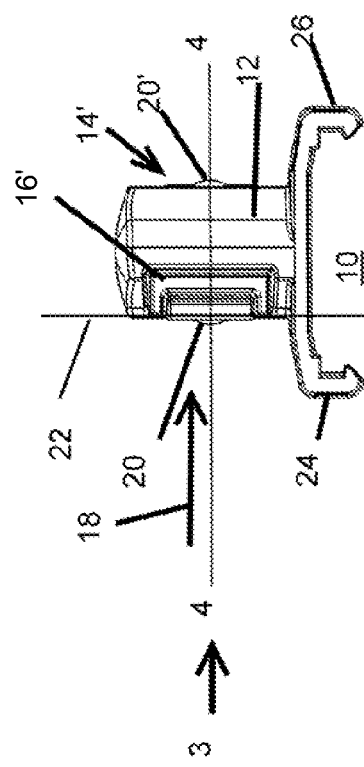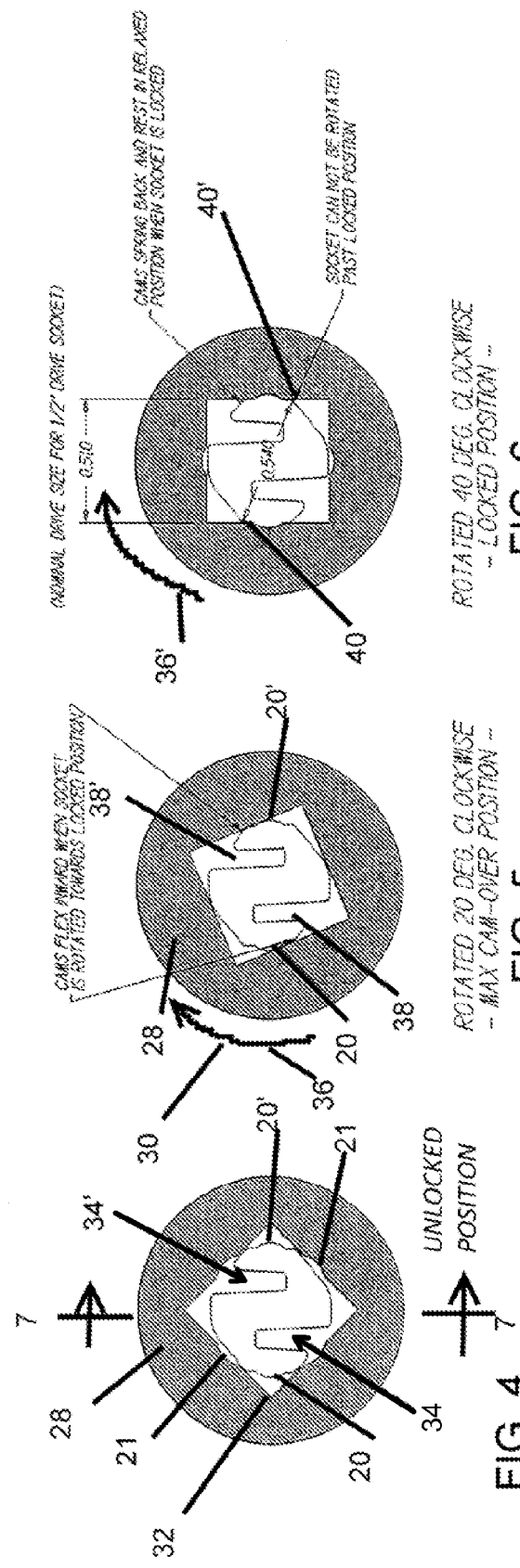

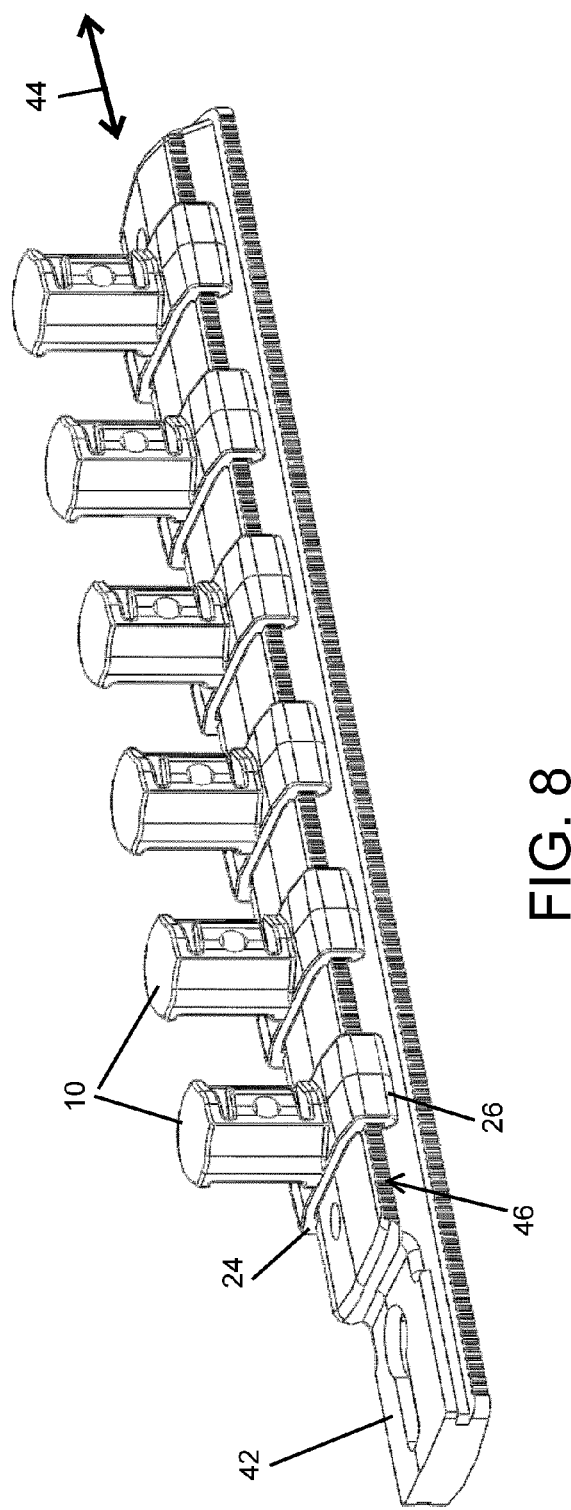

SINGLE COMPONENT TWIST LOCK SOCKET CLIP

BACKGROUND OF THE INVENTION

This invention relates to socket tools, and more particularly to a clip for holding sockets.

With socket wrenches, multiple sockets are provided for detachably mounting to the socket drive, whether manual or powered drive, to provide a variety of socket sizes. Organizing and keeping the detached sockets contained for storage and transport is desirable.

Such organization often comprises providing a socket mounting member to receive and hold sockets when not in use. While some of such mounting members have been twist type locking action, they have been manufactured and assembled from multiple components, requiring assembly and production of the multiple component portions, causing increased expense.

SUMMARY OF THE INVENTION

In accordance with the invention, a socket single component clip receives a socket bore over a post member, and upon twisting of the socket, a cam over member is compressed by interaction with the socket bore sidewalls. Continued twisting moves the socket such that the cam over member is released from compression, and flexes back outwardly to engage the socket bore detent. Twisting the socket in an opposite direction enables release of the socket from the clip.

Accordingly, it is an object of the present disclosure to provide an improved socket clip that can be manufactured as a single component piece.

It is a further object of the present disclosure to provide an improved socket retaining clip adapted for attachment to an organizer rail.

It is yet another object of the present disclosure to provide an improved socket clip with a cam over locking action that secures the socket to the clip with a twisting action.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 2 is a first side view of the socket clip;

FIG. 3 is a second side view 90 degrees from the view of FIG. 2;

FIGS. 4, 5 and 6 are top sectional views taken along line 4-4 of FIG. 2 illustrating interaction between the clip and a socket when engaging a socket with the clip;

FIG. 8 is a view of a socket rail with plural socket clips mounted thereon.

DETAILED DESCRIPTION

The system according to a preferred embodiment of the present invention comprises a single component socket clip with cam over function via arm members that compress during attachment of the socket, but release to a relaxed position when the socket is fully installed.

The clip body is a vertically aligned post with a modified octagon base section. When a socket is placed on the clip in the unlocked position, there is no interference between the body of the clip and the socket. As the socket is rotated clockwise, cam arms on opposing sides of the clip body interfere with the walls of the socket drive cavity. The socket meets some resistance at this point, and as the rotation continues, the cam arms are forced to flex inwardly. Once the socket is rotated past the vertex of the cam arms, the cam arms begin to spring back to their original position forcing the socket to rotate further clockwise into a locked position. The socket meets a wide point in the profile of the clip body preventing the socket from rotating past this locked position. Once in this locked position, the cam arms are mostly relaxed. The outer faces of the cam arms have protrusions that rest in the detents of the socket, preventing the socket from being pulled off of the clip. To remove the socket, it is rotated counterclockwise past the cams and back to the unlocked position where it can be easily removed. The total rotation needed to move from unlocked to locked, or from locked to unlocked, is approximately 40 degrees.

Figure 1:
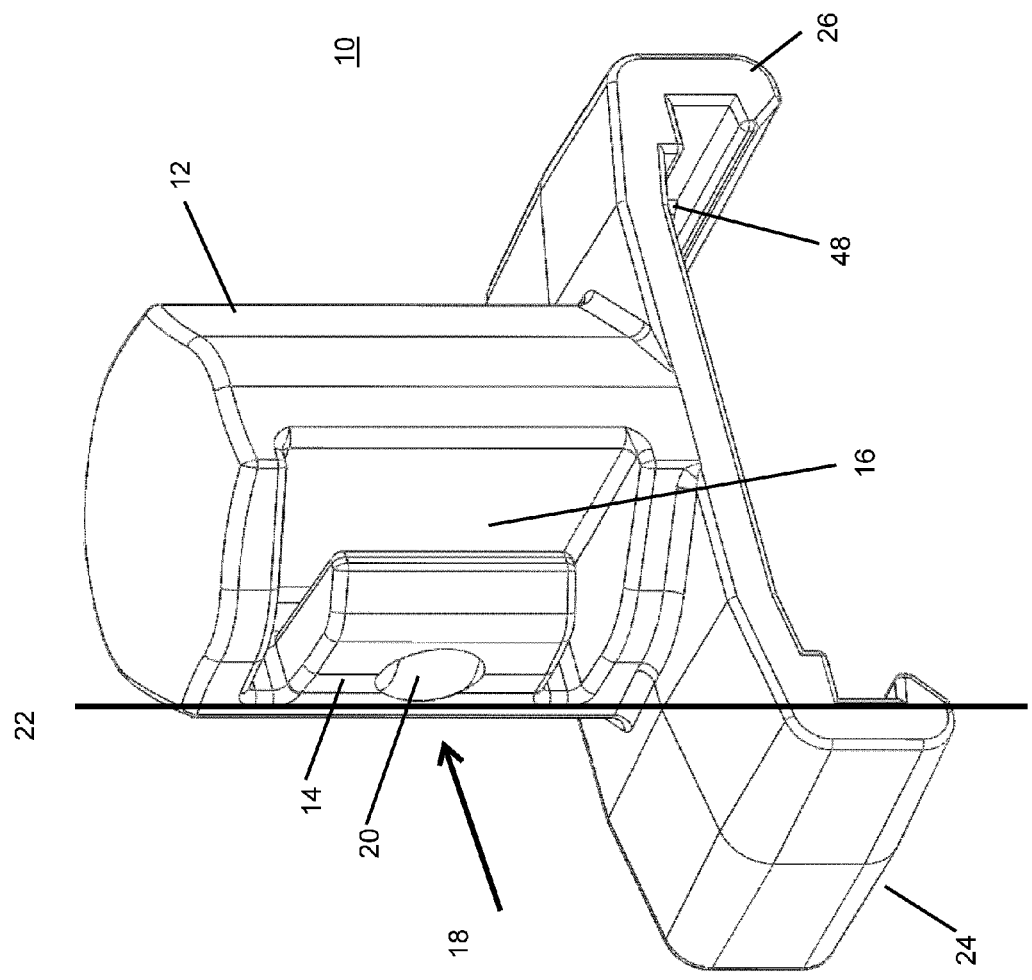
FIG. 1 is a perspective view of a socket clip in accordance with the present disclosure.

Referring to FIG. 1, a perspective view of a socket clip 10 in accordance with the present disclosure, the clip comprises a post member 12 having a modified octagonal shape when considered in horizontal cross section. In a mid-region of the post, a cam arm portion 14 is defined, with a hollow space 16 behind the cam arm to enable inward flexing of the cam arm into the space in the presence of inward pressure against the cam arm (for example in the direction of arrow 18). A raised engaging bump portion 20 is defined on an outer face of the cam arm, for corresponding engagement with a recessed portion of a socket (if present) when the socket is installed on the post. The cam arm portion is biased (from the properties of the material and construction configuration) to return to position in absence of inwardly biasing force in the direction of arrow 18.

When the cam arm portion is in a non-compressed state (as in FIG. 1, FIG. 2), raised engaging bump portion 20 extends outwardly away from the body of the post beyond a line 22 defined by the face of the cam arm portion.

The post portion may suitably be formed to include clip arm engaging members 24, 26, to enable the socket clip to be mounted to a socket clip rail for enabling multiple socket clips and corresponding sockets to be mounted and stored for ease of use, storage and transport.

Referring to FIG. 2, a first side view of the socket clip 10, a second cam arm 14', hollow space 16' and engaging bump portion 20' may be defined at an opposite side of the post 12 from cam arm 14, to provide a second engaging feature at the opposite side.

FIG. 3 is a side view taken at 90 degrees from the view of FIG. 2, looking in the direction of arrow 3, for example.

In use, a user installs a socket onto the clip by lowering the square bore portion of a socket onto the post 12 in the direction of arrow 27 (FIG. 3), and twisting the socket in a clockwise direction (for the illustrated embodiment) to engage the socket with the clip cam arms.

Figure 7:
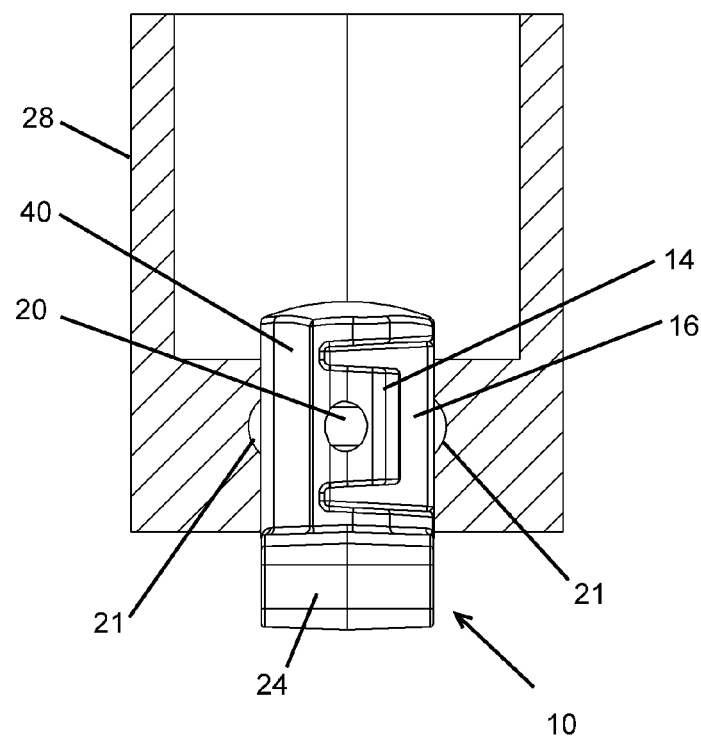
FIG. 7 is a side view of a socket clip with a socket mounted thereon, with the socket in section taken along line 7-7 in FIG. 4.

The interaction of the socket and the clip cam arms is illustrated in connection with FIGS. 4-6, top sectional views taken along line 4-4 of FIG. 2 and FIG. 7, a side view of a socket clip 10 with a socket mounted thereon, with the socket in section taken along line 7-7 in FIG. 4. When the socket 28 is lowered onto the post 12 in the direction of arrow 27 (FIG. 3), the socket is suitably positioned such that 2 opposing corners 30, 32 of the square socket bore are aligned above the raised engaging bump portions 20, 20' as the socket is lowered onto the post. In this position, the cam arms 14, 14' are substantially not compressed inwardly by the socket, resulting in a maximum distance span in the hollow portion at 34, 34' between the back face of the cam arms and the back of the hollows. The user now rotates the socket relative to the post 12 in the direction of arrow 36 (clockwise in this embodiment), wherein at 20 degrees rotation, as illustrated in FIG. 5, the cam arms 14, 14' are flexed inwardly toward the back face of the hollow space 16, by engagement between the engaging bump portions 20, 20' and the inner walls of the square socket bore. At 20 degrees rotation as in FIG. 5, the cam arms are compressed to the maximum amount, resulting in the closest distance 38, 38' between the cam arm back faces and the back face of the hollow portions.

As rotation continues, with reference to FIG. 6, at 40 degrees rotation, the socket reaches a locked position, where cam arms 14, 14' have flexed back outwardly to rest in a relaxed, uncompressed position, and the engaging bump portions 20, 20' have engaged with corresponding detents 21 in the socket. Seat face portions 40, 40' are defined on the cam arm portions 14, 14', and interact with the inner face of the square socket bore at this rotational position of the socket to block the socket from being further rotated past this locked position in the direction of arrow 36'. The user can release the socket and the socket is securely held on the clip until such time as the user wishes to remove the socket, which is accomplished by rotating the socket in a counter clockwise direction, resulting in the reversal of steps from FIG. 6, to FIG. 5 and then FIG. 4 configurations, whereupon the socket may be lifted off of the post 12.

Accordingly, the configuration and design of the socket clip employs cam over members that are in a relaxed state when in the engaged position, avoiding issues of fatigue or eventual alteration of the flexing portion as would result if the members were in constant compression when in the engaged position. Further, the shoulder seat configuration ensures that the sockets are not over-rotated beyond an engaged position.

The clip is formed as a single component which lowers cost of manufacturing and assembly. The clip can be provided as single clips adapted for attachment to existing socket clip rails, or can be formed as single piece multiple clip socket rails or other multiple socket holding configurations.

FIG. 8 is a perspective view of a socket clip rail having 6 socket clips 10 mounted thereon. Clip arm engaging members 24, 26 fit onto a corresponding profile of a clip receiving portion of rail 42 and may be positioned in desired locations along axis 44 across the extent of the clip receiving portion. Plural engaging ridges 46 can be provided along the clip receiving portion to provide a series of ridges and valleys for engagement with a corresponding raised member 48 defined in an inner face portion of members 24 and/or 26 discourage movement of the clips along axis 44 during use, once the clips have been positioned at a desired location on the rail and member 48 is positioned in a particular valley portion.

The clips can be manufactured from molded plastics, metals and other suitable materials or combinations thereof.

While the illustrated socket configuration shown in the examples is a socket having a recesses or detents, the socket clip also functions with impact sockets and the like which typically do not include a recess or detent in the socket.

The clip provides a universal manner by which a socket is secured to another body, typically a tool organizer rail, but can be used in various configurations. A socket can easily be slipped on or off of the clip when in the unlocked position, but once locked by twisting the socket, the socket becomes securely attached to the clip. Secure transport and handling of multiple sockets is made possible by attaching several clips to an organizer rail. Since the clip is configured as a single component, it is more economical to manufacture and does not require assembly.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A single component socket holding member, for providing cam action engagement of a socket, comprising:
   a socket receiving post member for a bore portion of the socket thereon, said socket receiving post member having an axis for aligning with said bore portion;
   a socket wall engaging cam over member positioned on said post member, having a flexing portion engaged with said socket receiving post member along an extent thereof and free from engagement with said socket receiving post in a region other than along said extent thereof, said cam over member having a socket detent engaging member thereon, said flexing portion having an open space defined in back of an inner oriented face thereof relative to said axis of the socket receiving post member, adapted for enabling flexing inwardly and outwardly of said flexing portion substantially perpendicular to said axis and adapted for substantially not flexing along a direction parallel to said axis.

2. The single component socket holding member according to claim 1, wherein said cam over member is adapted for compression during an engaging step of attaching the socket and for release from said compression when at an engaged position with the socket.

3. The single component socket holding member according to claim 1, wherein said socket receiving post member and said cam over member are formed from a plastic.

4. The single component socket holding member according to claim 1, wherein said socket receiving post member and said cam over member are formed from a metal.

5. The single component socket holding member according to claim 1, further comprising an engaging shoulder portion for defining a stop position when the socket is fully engaged to the clip.

6. The single component socket holding member according to claim 1, wherein said region is defined spaced away from an upper portion and a lower portion of said socket receiving post member.

* * * * *